United States Patent
Kirsch et al.

(10) Patent No.: US 11,816,307 B1
(45) Date of Patent: Nov. 14, 2023

(54) METHOD FOR PROVIDING SERVICE OF CONFIGURING UI ON A DISPLAY OF AN IN-VEHICLE INFOTAINMENT DEVICE AND UI CONFIGURATION SERVER USING THE SAME

(71) Applicants: Honda Motor Co., Ltd., Tokyo (JP); Obigo Inc., Seongnam-si (KR)

(72) Inventors: David M. Kirsch, Torrance, CA (US); Jerry Erin Bonnah, Huntington Beach, CA (US); Justin Sinaguinan, Los Angeles, CA (US); Young Suk Lee, Anyang-si (KR); Seo Young Lee, Seoul (KR); Dae Hee Ryoo, Suwon-si (KR)

(73) Assignees: Honda Motor Co., Ltd., Tokyo (JP); Obigo, Inc., Seongnam Si (KR)

( * ) Notice: Subject to any disclaimer, the term of this patent is extended or adjusted under 35 U.S.C. 154(b) by 0 days.

(21) Appl. No.: 18/159,224

(22) Filed: Jan. 25, 2023

Related U.S. Application Data

(60) Provisional application No. 63/339,015, filed on May 6, 2022.

(51) Int. Cl.
*G06F 3/0482* (2013.01)
*G06F 9/451* (2018.01)

(52) U.S. Cl.
CPC ............ *G06F 3/0482* (2013.01); *G06F 9/451* (2018.02)

(58) Field of Classification Search
CPC ............................... G06F 3/0482; G06F 9/451
USPC ........................................................ 715/765
See application file for complete search history.

(56) References Cited

U.S. PATENT DOCUMENTS

| | | | | |
|---|---|---|---|---|
| 8,831,824 B2* | 9/2014 | Moinzadeh | ......... | H04M 1/6091 |
| | | | | 455/418 |
| 10,402,161 B2* | 9/2019 | Feit | ......................... | G06F 3/167 |
| 10,860,192 B2* | 12/2020 | Feit | ......................... | B60K 35/00 |
| 11,087,798 B2* | 8/2021 | Sailer | ....................... | H04L 51/10 |
| 11,307,756 B2* | 4/2022 | Feit | ....................... | G06F 3/03547 |
| 11,372,610 B2* | 6/2022 | Gomes Chang | ...... | G06F 3/1423 |
| 11,467,718 B2* | 10/2022 | Masu | ....................... | H04L 51/52 |
| 2012/0204110 A1* | 8/2012 | Cabral | .................. | G06F 3/0482 |
| | | | | 715/727 |
| 2012/0260164 A1* | 10/2012 | Scheufler | .............. | G06F 3/0482 |
| | | | | 715/702 |
| 2013/0106693 A1* | 5/2013 | Okuyama | ............. | G06F 3/0482 |
| | | | | 345/157 |
| 2014/0289631 A1* | 9/2014 | Onaka | .................... | B60K 37/06 |
| | | | | 715/825 |

(Continued)

*Primary Examiner* — William D Titcomb
(74) *Attorney, Agent, or Firm* — Armstrong Teasdale LLP

(57) ABSTRACT

A method for configuring a UI (User Interface) displayed on a display of an IVI (In-Vehicle Infotainment) device is provided. The method includes: (a) in response to acquiring a setting request for the UI, displaying (i) a default UI template list, and (ii) a setting interface through a screen of a user device; (b) allowing (i) a UI configuration management module to generate specific screen configuration defining data, and (ii) an API gateway module to generate each of specific integrated data; and (c) after transmitting the specific screen configuration defining data and the specific integrated data to the IVI device, allowing a client program based on a Web Browser, to thereby (i) display the specific template through the display of the IVI device, and (ii) display each of the specific contents through each of the specific tiles.

16 Claims, 10 Drawing Sheets

(56) References Cited

U.S. PATENT DOCUMENTS

| | | | |
|---|---|---|---|
| 2015/0121274 A1* | 4/2015 | Kishimoto | G06F 3/04883 |
| | | | 715/771 |
| 2015/0202962 A1* | 7/2015 | Habashima | B60K 37/06 |
| | | | 345/633 |
| 2015/0324067 A1* | 11/2015 | Cabral | G06F 9/451 |
| | | | 715/811 |
| 2015/0378598 A1* | 12/2015 | Takeshi | G06F 3/016 |
| | | | 715/773 |
| 2019/0138184 A1* | 5/2019 | Kim | G06F 3/0416 |
| 2022/0157087 A1* | 5/2022 | Yamaoka | G10L 25/63 |
| 2022/0297505 A1* | 9/2022 | Takano | G06F 3/04842 |

* cited by examiner

FIG. 4

```
{
  {"template" : "default",
   "contents" : [
    {
      "group" : "news",                                          — 411
      "site" : "The Wall Street Journal",                        — 412
      "url" : "https://www.wsj.com/",                            — 413
      "Type" : "iframe",                                         — 414
      "position" : "first"                                       — 415
    },
    {
      "group' : "map",
      "site" : "Here"
      "url" : " ",
      "type" : "api",
      "position" : "second"
    },
    {
      "group' : "weather",
      "site" : "Vaisala"
      "url" : " ",
      "type" : "api",
      "position" : "third"
    },
    {
      "group' : "entertainment",
      "site" : "YouTube"
      "url" : "https://www.youtube.com/embed/LBrgitkboBg ",
      "type" : "iframe",
      "position" : "fourth"
    },
    {
      "group' : "music",
      "site" : "Spotify"
      "url" : " ",
      "type" : "api",
      "position" : "fifth"
    }
   ]
  }
}
```

410 — first block
420 — second block
430 — third block
440 — fourth block
450 — fifth block

METHOD FOR PROVIDING SERVICE OF CONFIGURING UI ON A DISPLAY OF AN IN-VEHICLE INFOTAINMENT DEVICE AND UI CONFIGURATION SERVER USING THE SAME

BACKGROUND

The present disclosure relates generally to In-Vehicle Infotainment (IVI) devices, and more specifically, to methods for providing a service of configuring a user interface (UI) on a display of an IVI device and a UI configuration server using the same.

An IVI device is desirable in connected cars, autonomous vehicles, buses, etc., and demands for various services and contents to be enjoyed on the IVI device are gradually increasing. Short update cycles for software in the IVI devices would help meet such demands.

However, unlike software used in a personal computer (PC) or smartphone applications, the software used in vehicles may be related to the safety of a driver, and therefore, there is an issue of considerable time and costs in development and verification compared to PC or smartphone applications.

Moreover, because most IVI devices currently used in vehicles have an operating system (OS) based on Android, IOS, Linux, Windows, and the like, various processes, such as compiling, downloading, and installing, are needed to perform software updates, and thus frequent downloads of large update files over a wireless network to perform the software updates may give rise to a problem of network costs, therefore, in reality, only limited updates are possible after commercialization.

Consequently, a method for changing a screen configuration of an IVI without compiling and/or transferring large update files is desired.

BRIEF DESCRIPTION

In one aspect, a method for providing a service of configuring a UI (User Interface) displayed on a display of an IVI (In-Vehicle Infotainment) device is provided. The method includes: (a) in response to acquiring a setting request for the UI from a user, a UI configuration server performing or supporting another device to perform a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user; (b) in response to selecting (i) specific template information related to a specific template containing one or more specific tiles and (ii) specific content attribute information related to each of specific contents to be displayed on each of the specific tiles by the user device through the setting interface, the UI configuration server performing or supporting another device to perform a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and (c) the UI configuration server transmitting the specific screen configuration defining data and the specific integrated data to the IVI device to allow a client program based on a Web Browser included in the IVI device to use the specific screen configuration defining data and the specific integrated data, to thereby (i) perform or support another device to perform a process of displaying the specific template through the display of the IVI device, and (ii) perform or support another device to perform a process of displaying each of the specific contents through each of the specific tiles.

In another aspect, a UI configuration server for providing a service of configuring a UI (User Interface) displayed on a display of an IVI (In-Vehicle Infotainment) device is provided. The UI configuration server includes at least one memory that stores instructions. The UI configuration server also includes at least one processor configured to execute the instructions to perform: (I) in response to acquiring a setting request for the UI from a user, a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user; (II) in response to selecting (i) specific template information related to a specific template containing one or more specific tiles and (ii) specific content attribute information related to each of specific contents to be displayed on each of the specific tiles by the user device through the setting interface, a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and (III) a process of transmitting the specific screen configuration defining data and the specific integrated data to the IVI device to allow a client program based on a Web Browser included in the IVI device to use the specific screen configuration defining data and the specific integrated data, to thereby (i) perform a process of displaying the specific template through the display of the IVI device, and (ii) perform a process of displaying each of the specific contents through each of the specific tiles.

BRIEF DESCRIPTION OF THE DRAWINGS

The drawings are used to explain example embodiments of the present disclosure and are only part of example embodiments of the present disclosure and other drawings can be obtained based on the drawings by those skilled in the art of the present disclosure without inventive work.

The embodiments described herein relate generally to devices and methods to allow a client program based on a Web Browser of an IVI device to change a screen configuration of the IVI device without a need to change a code of a software or without a need to install/update software. In order to reduce time and cost required to update an existing software, a method for changing a screen configuration of an IVI that only requires small update files by using a Web Browser based software (program) without a need for processes such as compiling, downloading, installing, is described herein.

FIG. 4 is a drawing illustrating specific screen configuration defining data in accordance with one example embodiment of the present disclosure.

DETAILED DESCRIPTION

Figure 1:
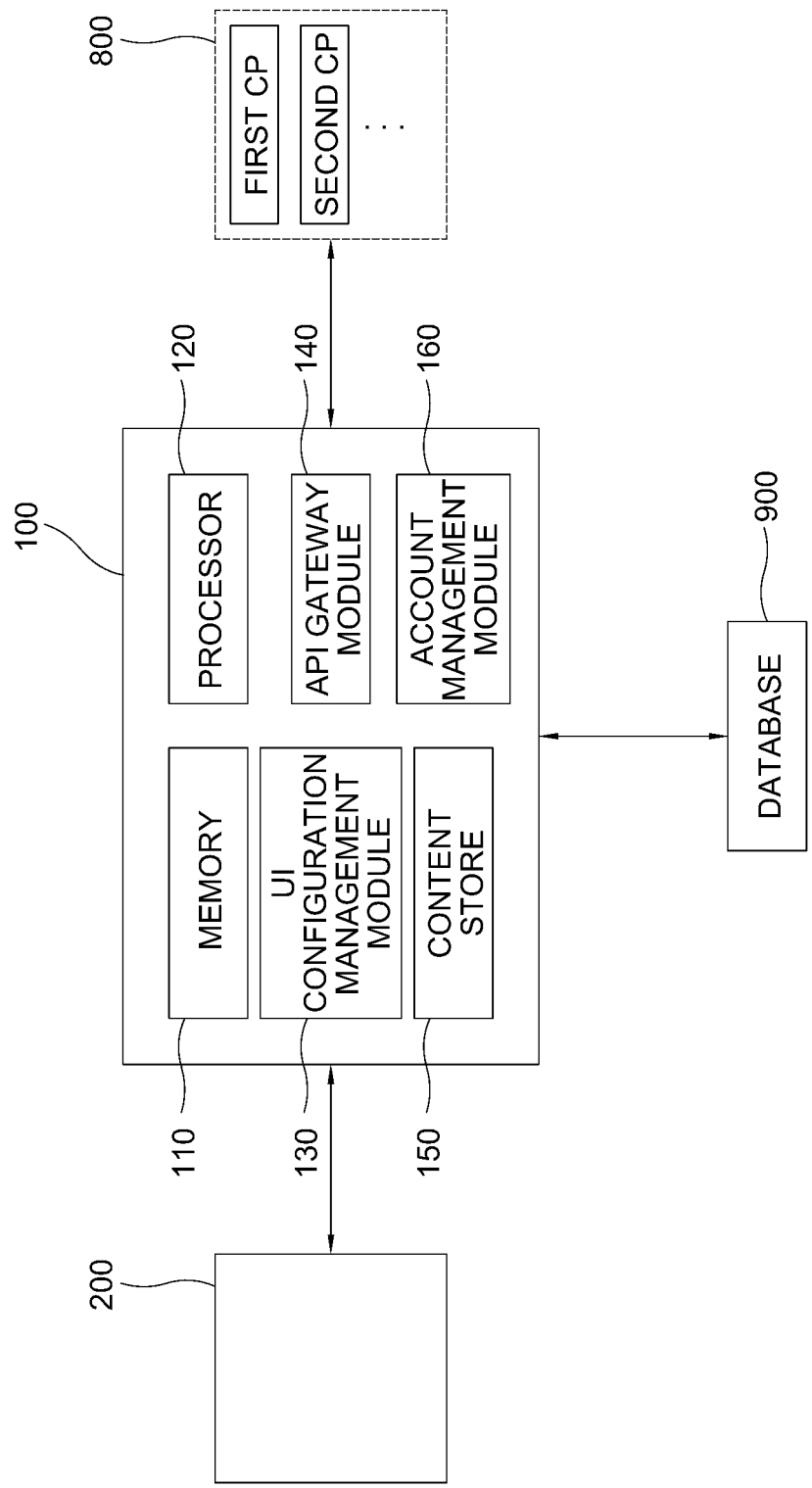
FIG. 1 is a schematic diagram of an example user interface (UI) configuration server for providing a service of configuring a UI displayed on a display of an In-Vehicle Infotainment (IVI) device.

In the following detailed description, reference is made to the accompanying drawings that show, by way of illustration, example embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a diagram schematically illustrating an example UI configuration server 100 for providing a service of configuring a UI (User Interface) displayed on a display of an IVI (In-Vehicle Infotainment) device in accordance with one example embodiment of the present disclosure.

As illustrated in FIG. 1, the UI configuration server 100 of the present disclosure may include a memory 110, a processor 120, a UI configuration management module 130, an Application Programming Interface (API) gateway module 140, a content store 150, and an account management module 160.

The memory 110 of the UI configuration server 100 may store instructions of the processor 120. Herein, the instructions are codes generated for the purpose of allowing the UI configuration server 100 to function in a specific manner, and can be implemented in a form of executable program command through a variety of computer means recordable to computer readable media. The instructions may execute processes for performing functions described herein.

Further, the processor 120 of the UI configuration server 100 may include hardware configuration of MPU (Micro Processing Unit) or CPU (Central Processing Unit), cache memory, data bus, etc. Additionally, any OS (operating system) and software configuration of applications that achieve specific purposes may be further included.

Furthermore, the UI configuration management module 130 may generate data related to screen configurations, which may be displayed through the display of the IVI device, to provide them to the IVI device.

In addition, the API gateway module 140 may use data obtained from a CP (Content Provider), which provides content services, to generate each of unified integrated data for each of content categories and then to provide them to the IVI device.

Also, the content store 150 may have new UI templates, updated versions of default UI templates, and new contents such as new widget apps, new web services, etc. published on it, and the user may purchase or use for free the published templates, contents, etc. A combination of media and information components or "tiles" displayed in a various number of arrangements can be referred to as a UI template.

In addition, the account management module 160 may create and manage user accounts.

Moreover, the UI configuration server 100 may communicate with a database 900 which stores information required for performing or supporting another device to perform the service of configuring the UI to be displayed on the display of the IVI device. Herein, the database 900 may include at least one storage medium of flash memory type, hard disk type, multimedia card micro type (for example, SD or XD memory), RAM (Random Access Memory), SRAM (Static Random Access Memory), ROM (Read Only Memory), EEPROM (Electrically Erasable Programmable Read Only Memory), PROM (Programmable Read Only Memory), magnetic memory, magnetic disk, optical disk, but it is not limited thereto, and may include any medium capable of storing data. Further, depending on an operating condition of the present disclosure, the database 900 may be installed separately from the UI configuration server 100, or may be installed within the UI configuration server 100 to transmit and record data, and may also be implemented separately into two or more databases, contrary to the illustration.

Furthermore, the UI configuration server 100 may send/receive necessary information to/from the IVI device 200. Herein, the IVI device 200 may include a client program based on a Web Browser.

Additionally, the UI configuration server 100 may send/receive necessary information to/from at least one CP server 800 which provides the contents and services that can be used on the IVI device 200. Herein, one CP server may provide a plurality of contents or a plurality of services, or a plurality of CP servers may provide their contents or their services. Further, only one CP server may provide the contents or the services for each of content categories or the plurality of CP servers may provide the contents or the services for each of the content categories.

A method for using a UI configuration server, for example, the UI configuration server 100, to provide the service of configuring the UI to be displayed on the display of an IVI device, for example, the IVI device 200, will be described with reference to FIG. 2.

Figure 2:
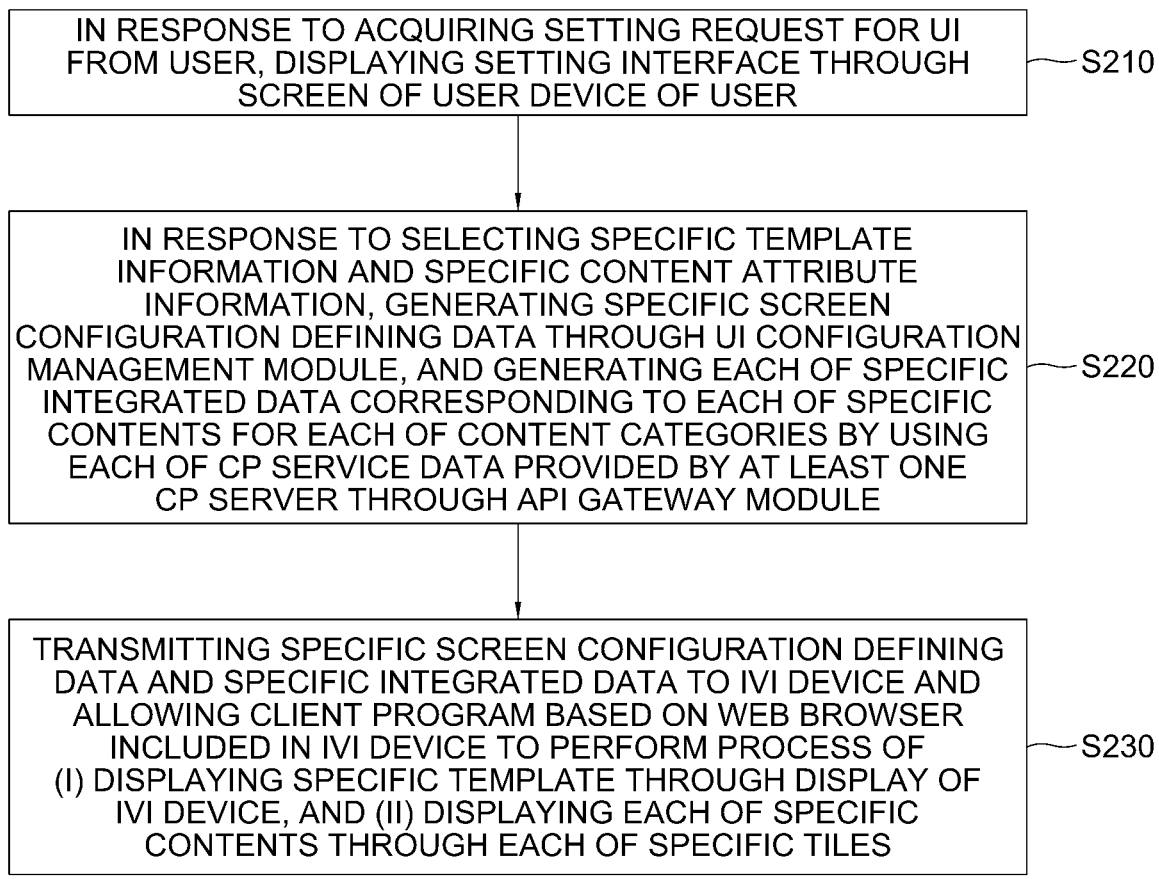
FIG. 2 illustrates an example method for providing the service of configuring the UI to be displayed on a display of the IVI device in accordance with one example embodiment of the present disclosure.

FIG. 2 is a block diagram illustrating an example method for providing the service of configuring the UI displayed on a display of an IVI device, for example, the IVI device 200 (shown in FIG. 1).

First, in response to acquiring a setting request for the UI from a user, the UI configuration server 100 may perform or support another device to perform processes of displaying (i) a default UI template list which contains information on one or more default UI templates, wherein the default UI templates contain one or more tiles through which one or more of the contents are to be displayed, and (ii) a setting interface which contains one or more metadata, each of which corresponds to each of the tiles, through a screen of a user device of the user, at a step of S210.

That is, the UI configuration server 100 may provide information on the default UI templates and information on the contents that may be displayed on each of the tiles contained in the default UI templates to the user device, to thereby allow the user to select the UI and contents to be displayed through the display of the IVI device 200.

Herein, the metadata may include: information related to types of the content categories that may appear on the tiles, information related to the CP that provides the contents, and information related to content data type, but they are not limited thereto.

In addition, the user device may be a smartphone, a laptop, etc., or may be the IVI device itself, but it is not limited thereto, and all devices capable of displaying the setting interface may be included.

Further, in response to selecting (i) specific template information related to a specific template containing one or more specific tiles and (ii) specific content attribute information related to each of specific contents to be displayed on each of the specific tiles by the user device through the setting interface, the UI configuration server 100 performs or supports another device to perform processes of allowing (i) a UI configuration management module 130 to generate specific screen configuration defining data corresponding to the specific template, and (ii) an API gateway module 140 to generate each of specific integrated data corresponding to each of the specific contents for each of the content categories by using each of CP service data provided by at least one CP server.

Specifically, the user may decide the specific template to be displayed through the display of the IVI device 200 and decide the contents to be displayed on each of the tiles by using the setting interface provided to the user device. Herein, the user may choose one template from the default UI templates as the specific template to be applied on the display of the IVI device 200, or may change at least one position of a tile among the tiles of the chosen template as the specific template to be applied on the display of the IVI device. In addition, the user may decide each of the contents corresponding to each of the tiles included in the specific template to be displayed through the display of the IVI device 200. Herein, the user may select each of the content categories corresponding to each of the tiles, and select which CP and what contents thereof to display for each of the tiles whose content categories are already selected, to thereby determine the specific content attribute information related to each of the specific contents to be displayed on each of the specific tiles. Further, the user may select a background screen to be displayed on the specific template by using information related to background screen provided by the setting interface. Herein, the background screen may be images, effects, animations, etc., but they are not limited thereto.

Figure 3A:
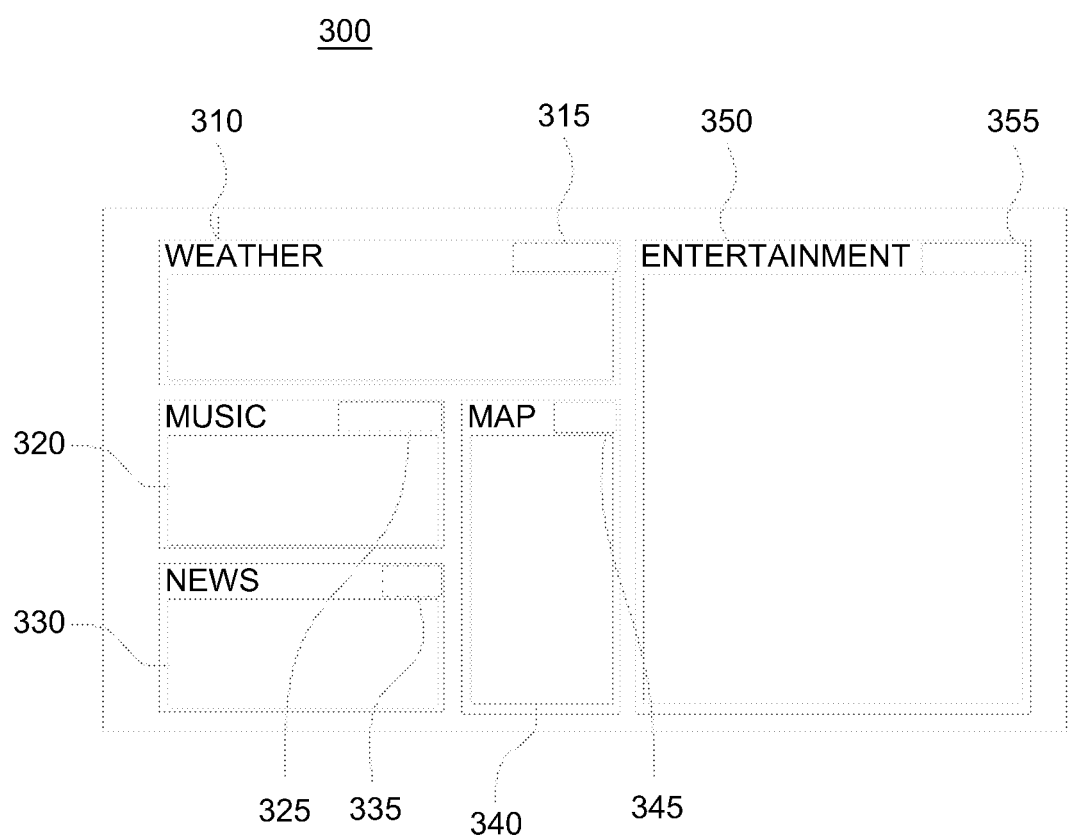
FIGS. 3A and 3B illustrate example templates and example content attribute information selected by a specific user in accordance with one example embodiment of the present disclosure.
Figure 3B:
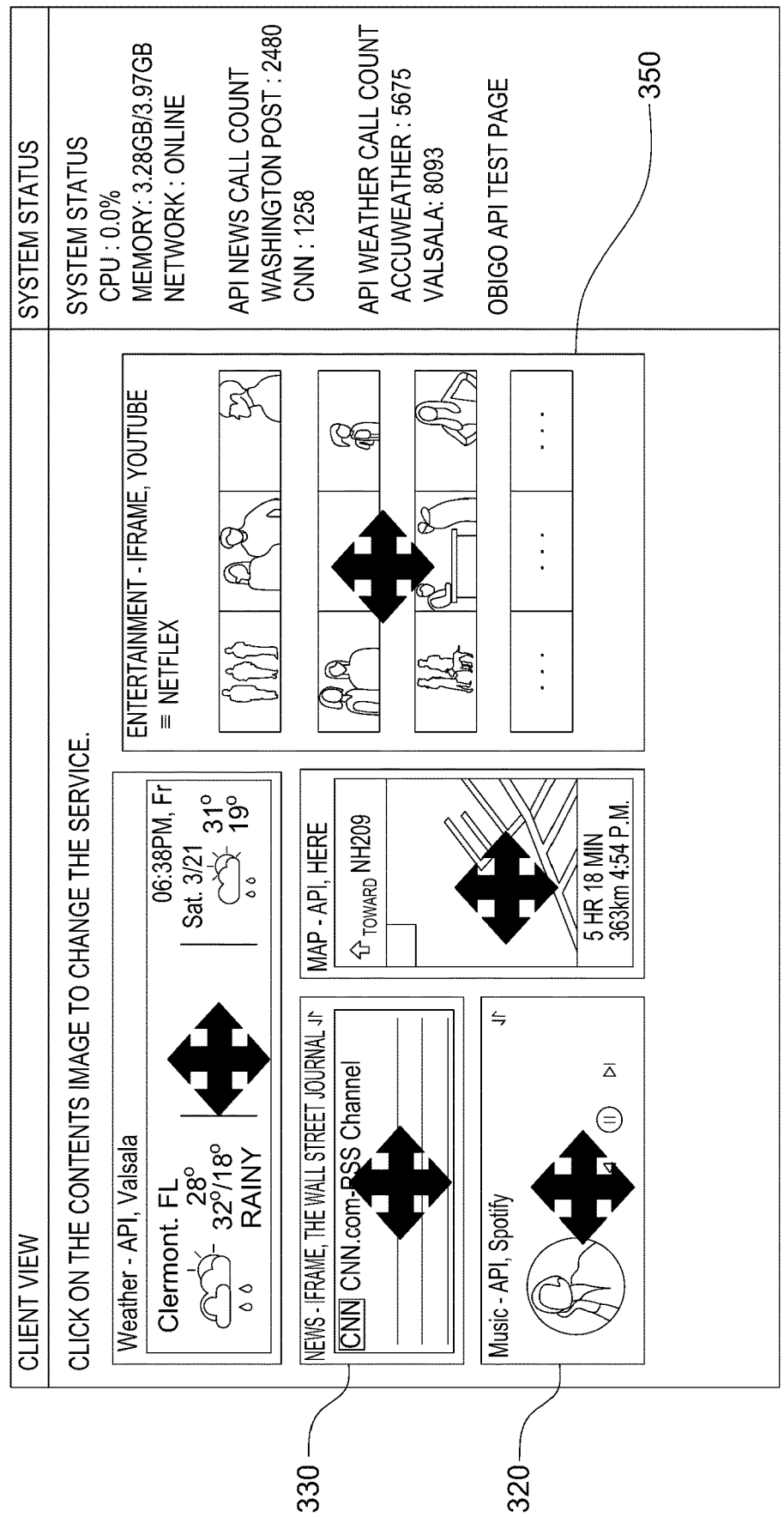

For example, with reference to FIG. 3A, the user may select the specific template 300 which contains 5 specific tiles: a first tile 310, a second tile 320, a third tile 330, a fourth tile 340, and a fifth tile 350. Herein, among the content categories, the first tile 310 may be selected to display weather, the second tile 320 may be selected to play music, and the third tile 330 may be selected to display news. Additionally, among the content categories, the user may select maps to be displayed on the fourth tile 340, and may select entertainment to be displayed on the fifth tile 350. Further, the user may use predetermined GUIs 315, 325, 335, 345, and 355 to determine which of the contents to be displayed for each of the tiles whose content categories are already selected. Specifically, as illustrated in FIG. 3B, the user may select CNN news to be displayed on the third tile 330 (CNN is a registered trademark of Cable News Network, Inc.), and select Netflix to be displayed on the fifth tile 350 (Netflix is a registered trademark of Netflix Inc.). Furthermore, among the tiles illustrated in FIG. 3A, the second tile 320 which displays a category of music and the third tile 330 which displays a category of news may switch their position with each other as illustrated in FIG. 3B.

As such, when the specific template information and the specific content attribute information are selected, the UI configuration server 100 may allow the UI configuration management module 130 to perform or support another device to perform a process of generating the specific screen configuration defining data corresponding to the specific template. Herein, the specific screen configuration defining data includes at least part of information on a cardinal number of the specific tiles, a position of each of the specific tiles, a category of each of the specific contents displayed on each of the specific tiles, a data type of each of the specific contents displayed on each of the specific tiles, information on the CP which provides each of the specific contents, and the background screen.

For example, with reference to FIG. 4, the specific screen configuration defining data may be created separately by each of content parts 410, 420, 430, 440, and 450. For example, each of the content parts may include: category group 411, site name 412, URL 413, data type 414, and position information 415.

Furthermore, the API gateway module 140 may perform at least one of (i) a protocol conversion process for converting each of data formats of each of CP service data corresponding to each of the content categories into a specific data format, (ii) a common data extraction process for extracting data that are in common among data included in the CP service data, and (iii) a key name changing process for changing a name of each key value of the CP service data to a name of a specific key value, to thereby generate the specific integrated data.

Herein, the specific data format may be one of HTML, XML, JSON, and RSS, but it is not limited thereto.

In addition, the API gateway module 140 may perform a process of changing a date display format included in each of the CP service data corresponding to each of the content categories to a specific date display format in order to generate the specific integrated data that additionally include the specific date display format. Moreover, the API gateway module 140 may perform a process of changing each of icons corresponding to each of the content categories to a specific integrated icon in order to generate the specific integrated data that additionally include the specific integrated icon.

Figure 5:
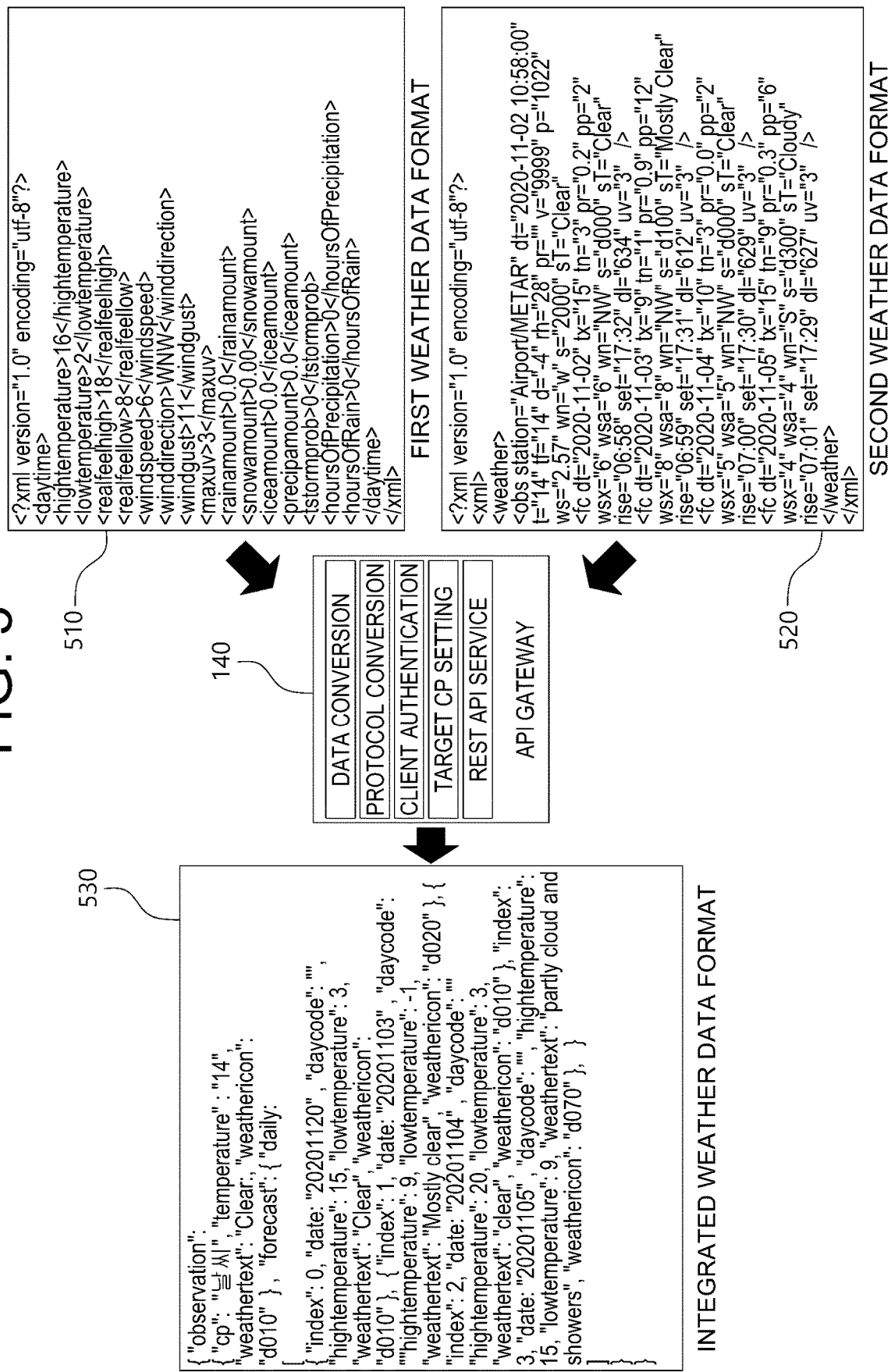
FIG. 5 is a drawing illustrating a generation of specific integrated data in accordance with one example embodiment of the present disclosure.

For example, with reference to FIG. 5, a company A, which is a CP of weather contents, may provide a first weather data format 510, and a company B, which is also a CP of weather contents, may provide a second weather data format 520, and if the first weather data format 510 and the second weather data format 520 are different from each other, the API gateway module 140 may perform (i) the protocol conversion process by converting the first weather data format 510 of XML and the second weather data format 520 of XML to the integrated weather data format 530 of JSON, (ii) the common data extraction process by extracting data included in the first weather data format 510 and the second weather data format 520 that are in common (e.g. maximum temperature, minimum temperature, weather texts, weather icons, etc.), (iii) the key name changing process by changing each of names of key values of the first weather data format 510 and the second weather data format 520 to a name of a specific key value (e.g. changing tx and tn respectively to hightemperature and lowtemperature, where tx and tn are the names of the key values included in the second weather data format 520), (iv) the process of changing the date display format to the specific date display format (e.g. changing "2020-11-02 11:58:00" included in the second weather data format 520 to "20201105"), and (v) the process of changing each of the icons corresponding to each of the content categories, e.g. changing the weather icon to a specific integrated weather icon (e.g. changing d000 in the second weather data format 520 to d050 in the integrated weather data format 530). Accordingly, the integrated weather data 530 can be acquired as the specific integrated data. Herein, the API gateway module 140 may perform processes related to at least some of data conversion, protocol conversion, client authentication, target CP setting, and REST API service to generate the specific integrated data.

Next, the UI configuration server 100 transmits the specific screen configuration defining data and the specific integrated data to the IVI device 200 to allow the client program based on the Web Browser included in the IVI device to use the specific screen configuration defining data and the specific integrated data and thus to (i) perform or support another device to perform a process of displaying the specific template through the display of the IVI device and (ii) perform or support another device to perform a process of displaying each of the specific contents through each of the specific tiles.

Herein, the client program configures the specific template in HTML by using the specific screen configuration defining data, to thereby display the configured specific template through the display of the IVI device 200. Herein, a position and a size of each of the specific tiles included in the specific template are defined by using at least one of CSS or JavaScript.

Figure 6:
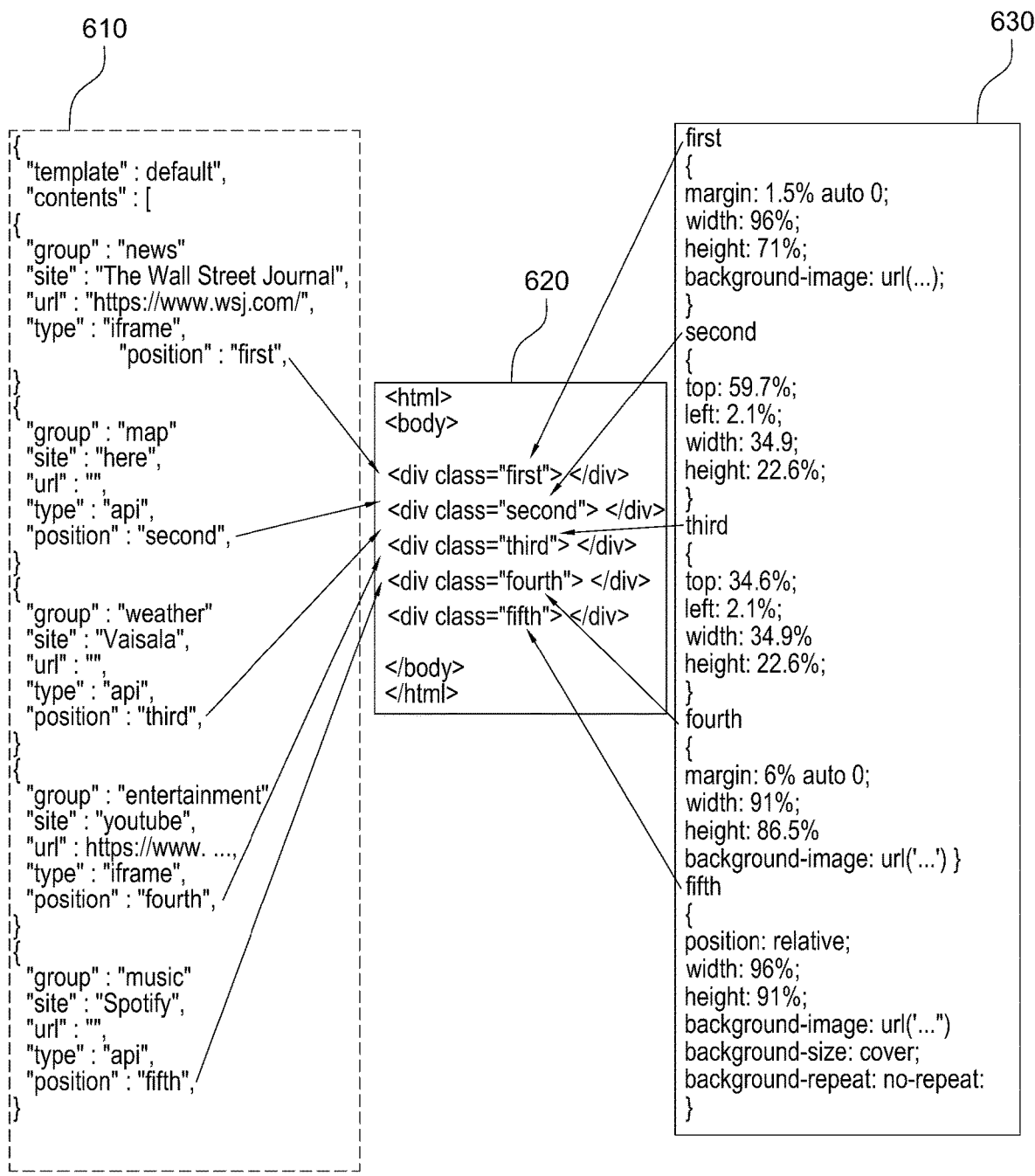
FIG. 6 is a drawing illustrating how a client program of the IVI device configures a screen in accordance with one example embodiment of the present disclosure.

For example, with reference to FIG. 6, the client program may configure the specific template in HTML 620 by using the specific screen configuration defining data 610. Herein, information related to the position and the size of the specific template may be defined using CSS 630.

In addition, the specific template displayed on the display of the IVI device 200 includes a screen changing interface which allows at least one of a positioning GUI capable of allowing each of the specific tiles to change position and a sizing GUI capable of allowing at least one of the specific tiles to change size to a predetermined size to be displayed on the display of the IVI device.

Figure 7A:
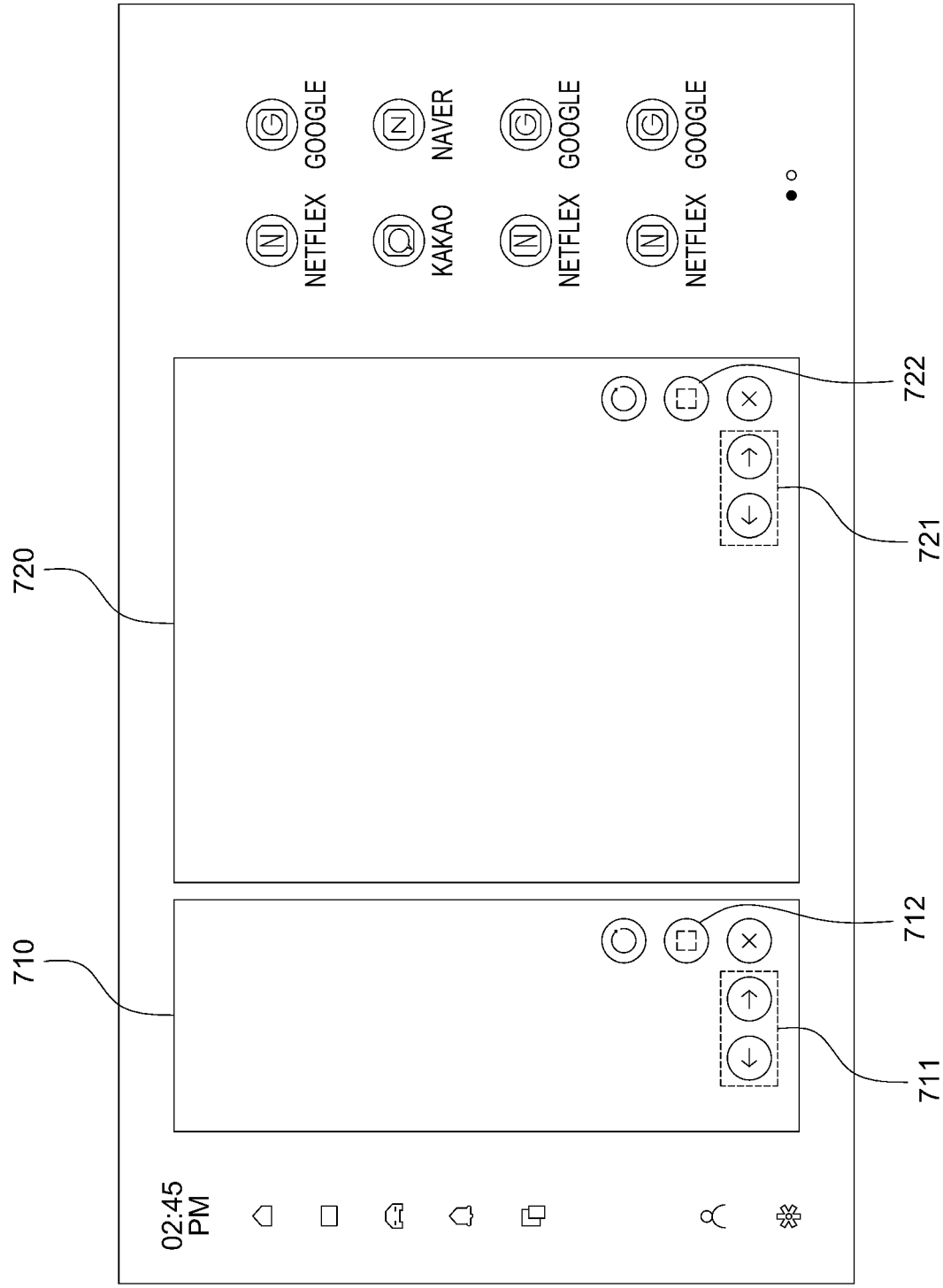
FIGS. 7A and 7B illustrate an example screen changing interface included in the example template displayed through a display of the IVI device in accordance with one example embodiment of the present disclosure.
Figure 7B:
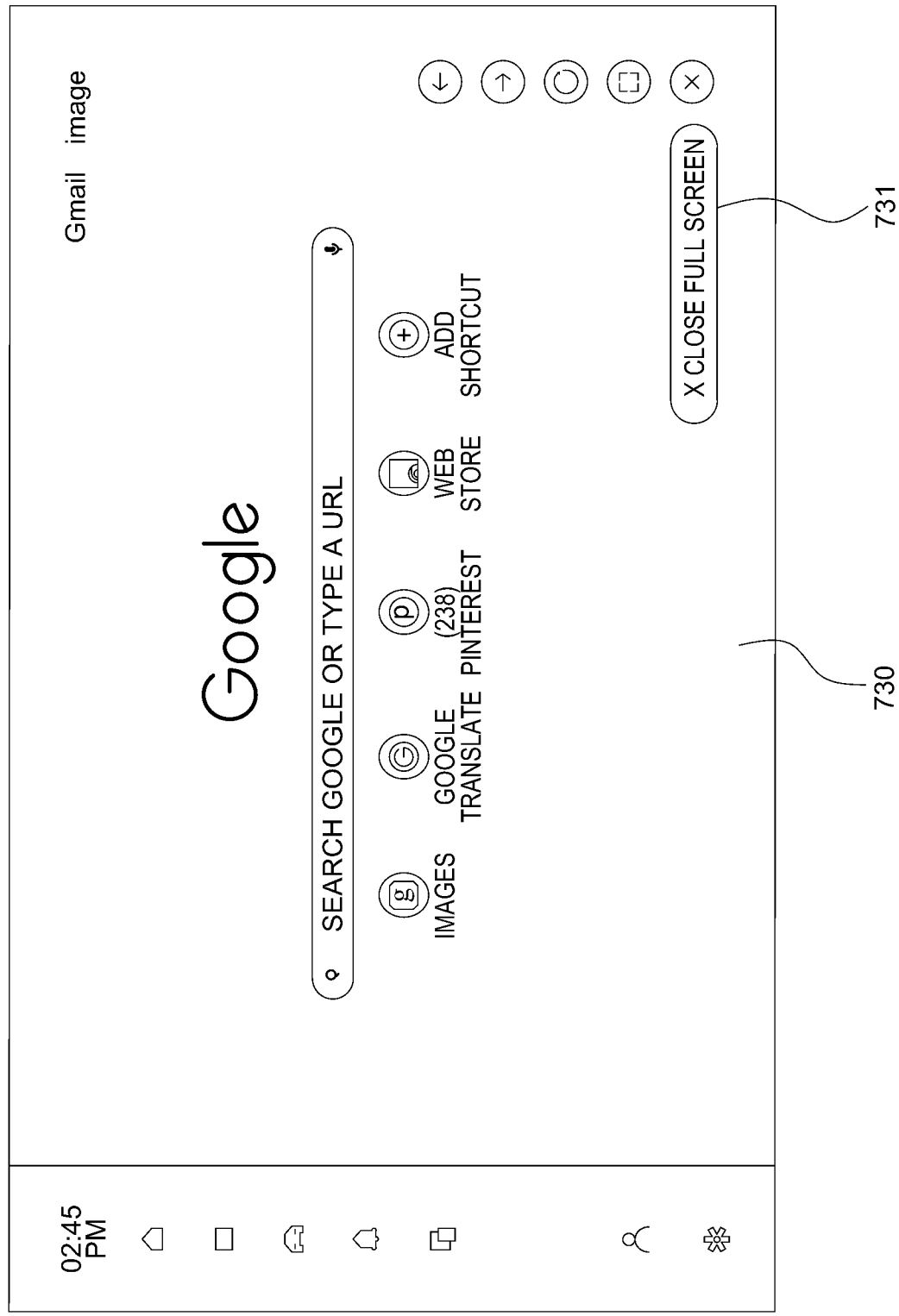

For example, with reference to FIG. 7A, (i) a first positioning GUI 711 and a first sizing GUI 712 of a first tile 710, (ii) a second positioning GUI 721 and a second sizing GUI 722 of a second tile 720 are included in the specific template displayed through the display of the IVI device 200. Herein, the user may use the first positioning GUI 711 of the first tile 710 to move the first tile 710 left or right, or change its position with that of the second tile 720. Further, the size of the first tile 710 may be changed to the predetermined size by using the first sizing GUI 712 of the first tile 710. Likewise, the user may use the second positioning GUI 721 of the second tile 720 to move the second tile 720 left or right, or change its position with that of the first tile 710. Furthermore, the size of the second tile 720 may be changed to the predetermined size by using the second sizing GUI 722 of the second tile 720. Herein, the predetermined size may be a full size which only allows contents of a third tile 730 to be displayed through the specific template. The third tile 730 in full size may be returned to its original size by using a GUI 731.

The steps S210 to S230 of the method for providing the service of configuring the UI displayed on the display of the IVI device described above are applicable to the remaining example embodiments that will be described below.

At the step of S210 of the present disclosure, the setting interface described above includes (i) a new UI template list related to one or more of the new UI templates having template configurations that are different from those of the default UI templates, and (ii) the content store 150 which provides connection information to access one or more new content services among the new content services related to new contents for each of the content categories.

That is, the user may check information related to the new UI templates published on the content store 150 by referring to content store information, and may also check the latest versions of the default UI templates. In addition, the user may check information related to the new contents such as widget apps, web services, etc. published on the content store 150 by referring to the content store information. Herein, the new UI templates and the new contents published on the content store 150 may be provided through various payment options such as free, paid, trial, subscription, etc.

Figure 8:
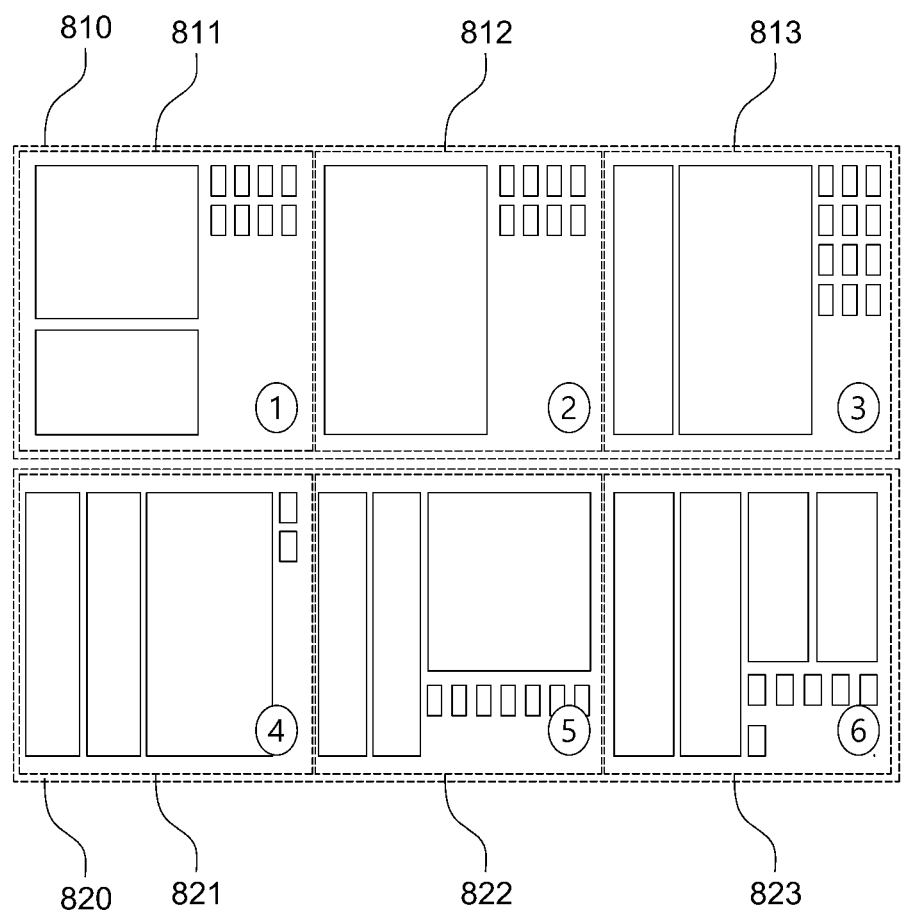
FIG. 8 is a drawing illustrating default UI templates and new UI templates in accordance with one example embodiment of the present disclosure.

For example, with reference to FIG. 8, if a type (1) template 811, a type (2) template 812, and a type (3) template 813 are provided as the default UI templates 810, then a type (4) template 821, a type (5) template 822, and a type (6) template 823, which have different layout configurations from the default UI templates 810, may be published as the new templates 820 on the content store 150. Herein, the new UI templates 820 may only be available for those who purchased them, and may be added to the default UI templates later on.

Herein, the new UI templates may be comprised of scripts and images for various screen effects or functions based on the CSS and the web page. For example, the new UI templates may be published on the content store 150 in a compressed file having a structure as shown in <Table 1>below.

TABLE 1

| new template.zip | |
|---|---|
| HTLM | main.html |
| CSS | /css/main.css |
| Javascript | /js/main.js |
| Image | /img/backimg.png |
| | /img/log.png |

Herein, in response to selecting a specific new UI template, which is one of the new UI templates, by the user device with reference to the content store information, the UI configuration server 100 checks the default UI template list to determine whether the specific new UI template corresponds to one of the default UI templates, and in case the specific new UI template is determined not to correspond to one of the default UI templates, the specific new UI template is added to the default UI template list.

That is, by adding the specific new UI template to the default UI template list, the user who purchases the specific new UI template will be able to select the specific new UI template and set it as UI to be applied on the display of the IVI device.

Moreover, the UI configuration server 100 may manage user accounts by classifying the user into one of an individual, a business, or a vehicle manufacturer, and further includes an account management module 160 that manages a range of settable configurations of the UI depending on each of the user accounts.

For example, any UI changes made by an individual will be applied to his or her vehicle, any UI changes made by the business will be applied to their buses, etc. operated by them, and any UI changes made by the vehicle manufacturer will be applied to vehicles manufactured by them, but it is not limited thereto.

The present disclosure has an effect of allowing a client program based on the Web Browser of the IVI device to change the screen configuration of the IVI device without a need to change a code of a software or without a need to install/update a software.

The present disclosure has another effect of displaying the contents without changing the client program even if the CP which provides the contents to be displayed on the display of the IVI device is changed or even if a data format of the contents to be provided is changed.

The present disclosure has still another effect of storing new data, new web widgets, new UI templates, etc., in the content store, and allowing the user or an operator to purchase or use for free desired services, desired contents, etc., to thereby allow the desired services or the desired contents to be applied to the IVI device of a vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

It is an object of the present disclosure to solve all the aforementioned problems.

It is another object of the present disclosure to allow a client program based on a Web Browser of an IVI (In-Vehicle Infotainment) device to change a screen configuration of the IVI device without a need to change a code of a software or without a need to install/update a software.

It is still another object of the present disclosure to display contents without changing a client program even if a CP (Content Provider) which provides the contents to be displayed on a display of the IVI device is changed or even if a data format of the contents to be provided is changed.

It is still yet another object of the present disclosure to store new data, new web widgets, new UI (User Interface) templates, etc. in a content store, and allow a user or an operator to purchase or use for free desired services, desired contents, etc., to thereby allow the desired services or the desired contents to be applied to the IVI device of a vehicle.

In order to accomplish the objects above, distinctive structures of the present disclosure are described as follows.

In accordance with one aspect of the present disclosure, there is provided a method for configuring a UI (User Interface) displayed on a display of an IVI (In-Vehicle Infotainment) device, including steps of: (a) in response to acquiring a setting request for the UI from a user, a UI configuration server performing or supporting another device to perform a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user; (b) in response to selecting (i) specific template information related to a specific template containing one or more specific tiles and (ii) specific content attribute information related to each of specific contents to be displayed on each of the specific tiles by the user device through the setting interface, the UI configuration server performing or supporting another device to perform a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and (c) the UI configuration server transmitting the specific screen configuration defining data and the specific integrated data to the IVI device to allow a client program based on a Web Browser included in the IVI device to use the specific screen configuration defining data and the specific integrated data, to thereby (i) perform or support another device to perform a process of displaying the specific template through the display of the IVI device, and (ii) perform or support another device to perform a process of displaying each of the specific contents through each of the specific tiles.

As one example, at the step of (a), the setting interface includes (i) a new UI template list related to one or more new UI templates having template configurations that are different from those of the default UI templates, and (ii) content store information which provides connection information to access one or more new content services among the new content services related to new contents for each of the content categories.

As one example, in response to selecting a specific new UI template, which is one of the new UI templates, by the user device with reference to the content store information, the UI configuration server checks the default UI template list to determine whether the specific new UI template corresponds to one of the default UI templates, and in case the specific new UI template is determined not to correspond to one of the default UI templates, the specific new UI template is added to the default UI template list.

As one example, at the step of (b), the API gateway module performs at least one of (i) a protocol conversion process for converting each of data formats of each of CP service data corresponding to each of content categories into a specific data format, (ii) a common data extraction process for extracting data that are in common among data included in the CP service data, and (iii) a key name changing process for changing a name of each key value of the CP service data to a name of a specific key value, to thereby generate the specific integrated data.

As one example, at the step of (b), the specific screen configuration defining data includes at least part of information on a cardinal number of the specific tiles, a position of each of the specific tiles, a category of each of the specific contents displayed on each of the specific tiles, a data type of each of the specific contents displayed on each of the specific tiles, CP which provides each of the specific contents, and a background screen.

As one example, at the step of (c), the client program configures the specific template in HTML by using the specific screen configuration defining data, to thereby display the configured specific template through the display of the IVI device, and wherein a position and a size of each of the specific tiles included in the specific template are defined by using CSS or JavaScript.

As one example, at the step of (c), the specific template displayed on the display of the IVI device includes a screen changing interface which allows at least one of a positioning GUI capable of allowing each of the specific tiles to change position, and a sizing GUI capable of allowing at least one of the specific tiles to change size to a predetermined size to be displayed on the display of the IVI device.

As one example, the UI configuration server manages user accounts by classifying the user into one of an individual, a business, or a vehicle manufacturer, and further includes an account management module that manages a range of settable configurations of the UI differently depending on each of the user accounts.

In accordance with another aspect of the present disclosure, there is provided a UI configuration server for providing a service of configuring a UI (User Interface) displayed on a display of an IVI (In-Vehicle Infotainment) device, including: at least one memory that stores instructions; and at least one processor configured to execute the instructions to perform: (I) in response to acquiring a setting request for the UI from a user, a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user; (II) in response to selecting (i) specific template information related to a specific template containing one or more specific tiles and (ii) specific content attribute information related to each of specific contents to be displayed on each of the specific tiles by the user device through the setting interface, a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and (III) a process of transmitting the specific screen configuration defining data and the specific integrated data to the IVI device to allow a client program based on a Web Browser included in the IVI device to use the specific screen configuration defining data and the specific integrated data, to thereby (i) perform a process of displaying the specific template through the display of the IVI device, and (ii) perform or support another device to perform a process of displaying each of the specific contents through each of the specific tiles.

As one example, at the process of (I), the setting interface includes (i) a new UI template list related to one or more new UI templates having template configurations that are different from those of the default UI templates, and (ii) content store information which provides connection information to access one or more new content services among the new content services related to new contents for each of the content categories.

As one example, in response to selecting a specific new UI template, which is one of the new UI templates, by the user device with reference to the content store information, the processor checks the default UI template list to determine whether the specific new UI template corresponds to one of the default UI templates, and in case the specific new UI template is determined not to correspond to one of the default UI templates, the specific new UI template is added to the default UI template list.

As one example, at the process of (II), the API gateway module performs at least one of (i) a protocol conversion process for converting each of data formats of each of CP service data corresponding to each of content categories into a specific data format, (ii) a common data extraction process for extracting data that are in common among data included in the CP service data, and (iii) a key name changing process for changing a name of each key value of the CP service data to a name of a specific key value, to thereby generate the specific integrated data.

As one example, at the process of (II), the specific screen configuration defining data includes at least part of information on a cardinal number of the specific tiles, a position of each of the specific tiles, a category of each of the specific contents displayed on each of the specific tiles, a data type of each of the specific contents displayed on each of the specific tiles, CP which provides each of the specific contents, and a background screen.

As one example, at the process of (III), the client program configures the specific template in HTML by using the specific screen configuration defining data, to thereby display the configured specific template through the display of the IVI device, and wherein a position and a size of each of the specific tiles included in the specific template are defined by using CSS or JavaScript.

As one example, at the process of (III), the specific template displayed on the display of the IVI device includes a screen changing interface which allows at least one of a positioning GUI capable of allowing each of the specific tiles to change position, and a sizing GUI capable of allowing at least one of the specific tiles to change size to a predetermined size to be displayed on the display of the IVI device.

As one example, the processor manages user accounts by classifying the user into one of an individual, a business, or a vehicle manufacturer, and further includes an account management module that manages a range of settable configurations of the UI differently depending on each of the user accounts.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

What is claimed is:

1. A method for providing a service of configuring a UI (User Interface) displayed on a display of an IVI (In-Vehicle Infotainment) device, comprising steps of:
   (a) in response to acquiring a setting request for the UI from a user, a UI configuration server performing or supporting another device to perform a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user;
   (b) in response to selecting (i) specific template information related to a specific template containing one or more specific tiles and (ii) specific content attribute information related to each of specific contents to be displayed on each of the specific tiles by the user device through the setting interface, the UI configuration server performing or supporting another device to perform a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and
   (c) the UI configuration server transmitting the specific screen configuration defining data and the specific integrated data to the IVI device to allow a client program based on a Web Browser included in the IVI device to use the specific screen configuration defining data and the specific integrated data, to thereby (i) perform or support another device to perform a process of displaying the specific template through the display of the IVI device, and (ii) perform or support another device to perform a process of displaying each of the specific contents through each of the specific tiles.

2. The method of claim 1, wherein, at the step of (a), the setting interface includes (i) a new UI template list related to one or more new UI templates having template configurations that are different from those of the default UI templates, and (ii) content store information which provides connection information to access one or more new content services among the new content services related to new contents for each of the content categories.

3. The method of claim 2, wherein, in response to selecting a specific new UI template, which is one of the new UI templates, by the user device with reference to the content store information, the UI configuration server checks the default UI template list to determine whether the specific new UI template corresponds to one of the default UI templates, and in case the specific new UI template is determined not to correspond to one of the default UI templates, the specific new UI template is added to the default UI template list.

4. The method of claim 1, wherein, at the step of (b), the API gateway module performs at least one of (i) a protocol conversion process for converting each of data formats of each of CP service data corresponding to each of content categories into a specific data format, (ii) a common data extraction process for extracting data that are in common among data included in the CP service data, and (iii) a key name changing process for changing a name of each key value of the CP service data to a name of a specific key value, to thereby generate the specific integrated data.

5. The method of claim 1, wherein, at the step of (b), the specific screen configuration defining data includes at least part of information on a cardinal number of the specific tiles, a position of each of the specific tiles, a category of each of the specific contents displayed on each of the specific tiles, a data type of each of the specific contents displayed on each of the specific tiles, CP which provides each of the specific contents, and a background screen.

6. The method of claim 1, wherein, at the step of (c), the client program configures the specific template in HTML by using the specific screen configuration defining data, to thereby display the configured specific template through the display of the IVI device, and
   wherein a position and a size of each of the specific tiles included in the specific template are defined by using CSS or JavaScript.

7. The method of claim 1, wherein, at the step of (c), the specific template displayed on the display of the IVI device includes a screen changing interface which allows at least one of a positioning GUI capable of allowing each of the specific tiles to change position, and a sizing GUI capable of allowing at least one of the specific tiles to change size to a predetermined size to be displayed on the display of the IVI device.

8. The method of claim 1, wherein the UI configuration server manages user accounts by classifying the user into one of an individual, a business, or a vehicle manufacturer, and further includes an account management module that manages a range of settable configurations of the UI differently depending on each of the user accounts.

9. A UI configuration server for providing a service of configuring a UI (User Interface) displayed on a display of an IVI (In-Vehicle Infotainment) device, comprising:
   at least one memory that stores instructions; and
   at least one processor configured to execute the instructions to perform: (I) in response to acquiring a setting request for the UI from a user, a process of displaying (i) a default UI template list which contains information on one or more default UI templates, wherein the default UI templates contain one or more tiles through which one or more contents are to be displayed, and (ii) a setting interface which contains one or more metadata, each of which corresponds to each of the tiles, through a screen of a user device of the user; (II) in response to selecting (i) specific template information related to a specific template containing one or more specific tiles and (ii) specific content attribute information related to each of specific contents to be displayed on each of the specific tiles by the user device through the setting interface, a process of allowing (i) a UI configuration management module to generate specific screen configuration defining data corresponding to the specific template, and (ii) an API gateway module to generate each of specific integrated data corresponding to each of the specific contents for each of content categories by using each of CP (Content Provider) service data provided by at least one CP server; and (III) a process of transmitting the specific screen configuration defining data and the specific integrated data to the IVI device to allow a client program based on a Web Browser included in the IVI device to use the specific screen configuration defining data and the specific integrated data, to thereby (i) perform a process of displaying the specific template through the display of the IVI device, and (ii) perform a process of displaying each of the specific contents through each of the specific tiles.

10. The UI configuration server of claim 9, wherein, at the process of (I), the setting interface includes (i) a new UI template list related to one or more new UI templates having template configurations that are different from those of the default UI templates, and (ii) content store information which provides connection information to access one or more new content services among the new content services related to new contents for each of the content categories.

11. The UI configuration server of claim 10, wherein, in response to selecting a specific new UI template, which is one of the new UI templates, by the user device with reference to the content store information, the processor checks the default UI template list to determine whether the specific new UI template corresponds to one of the default UI templates, and in case the specific new UI template is determined not to correspond to one of the default UI templates, the specific new UI template is added to the default UI template list.

12. The UI configuration server of claim 9, wherein, at the process of (II), the API gateway module performs at least one of (i) a protocol conversion process for converting each of data formats of each of CP service data corresponding to each of content categories into a specific data format, (ii) a common data extraction process for extracting data that are in common among data included in the CP service data, and (iii) a key name changing process for changing a name of each key value of the CP service data to a name of a specific key value, to thereby generate the specific integrated data.

13. The UI configuration server of claim 9, wherein, at the process of (II), the specific screen configuration defining data includes at least part of information on a cardinal number of the specific tiles, a position of each of the specific tiles, a category of each of the specific contents displayed on each of the specific tiles, a data type of each of the specific contents displayed on each of the specific tiles, CP which provides each of the specific contents, and a background screen.

14. The UI configuration server of claim 9, wherein, at the process of (III), the client program configures the specific template in HTML by using the specific screen configuration defining data, to thereby display the configured specific template through the display of the IVI device, and
wherein a position and a size of each of the specific tiles included in the specific template are defined by using CSS or JavaScript.

15. The UI configuration server of claim 9, wherein, at the process of (III), the specific template displayed on the display of the IVI device includes a screen changing interface which allows at least one of a positioning GUI capable of allowing each of the specific tiles to change position, and a sizing GUI capable of allowing at least one of the specific tiles to change size to a predetermined size to be displayed on the display of the IVI device.

16. The UI configuration server claim 9, wherein the processor manages user accounts by classifying the user into one of an individual, a business, or a vehicle manufacturer, and further includes an account management module that manages a range of settable configurations of the UI differently depending on each of the user accounts.

* * * * *